US011020903B2

(12) United States Patent
Herzog et al.

(10) Patent No.: US 11,020,903 B2
(45) Date of Patent: Jun. 1, 2021

(54) APPARATUS FOR ADDITIVELY MANUFACTURING OF THREE-DIMENSIONAL OBJECTS

(71) Applicant: CL SCHUTZRECHTSVERWALTUNGS GMBH, Lichtenfels (DE)

(72) Inventors: Frank Herzog, Lichtenfels (DE); Florian Bechmann, Lichtenfels (DE); Markus Stark, Waizenburg (DE)

(73) Assignee: CONCEPT LASER GMBH, Lichtenfels (DE)

( * ) Notice: Subject to any disclaimer, the term of this patent is extended or adjusted under 35 U.S.C. 154(b) by 129 days.

(21) Appl. No.: 15/789,352

(22) Filed: Oct. 20, 2017

(65) Prior Publication Data

US 2018/0111318 A1  Apr. 26, 2018

(30) Foreign Application Priority Data

Oct. 24, 2016 (DE) .......................... 102016120244.4

(51) Int. Cl.
*B29C 64/268* (2017.01)
*B29C 64/393* (2017.01)
(Continued)

(52) U.S. Cl.
CPC .......... *B29C 64/268* (2017.08); *B23K 26/064* (2015.10); *B23K 26/0626* (2013.01);
(Continued)

(58) Field of Classification Search
CPC .. B29C 64/268; B29C 64/393; B23K 26/0626
See application file for complete search history.

(56) References Cited

U.S. PATENT DOCUMENTS 9,044,824 B2   6/2015 Olsen
9,889,523 B2   2/2018 Gauch et al.
(Continued)

FOREIGN PATENT DOCUMENTS

JP   H04267132 A    9/1992
JP   2003/220488 A  8/2003
(Continued)

OTHER PUBLICATIONS

English machine translation of JP2005254281 (Year: 2020).*
(Continued)

*Primary Examiner* — Jacob T Minskey
*Assistant Examiner* — Jennifer A Kessie
(74) *Attorney, Agent, or Firm* — Dority & Manning, P.A.

(57) ABSTRACT

An apparatus (1) for additive manufacturing of three-dimensional objects (2) by successive, selective layer-by-layer exposure and thus solidification of construction material layers of a construction material (3) that can be solidified by means of a laser beam (5) generated by a laser beam generation device (4), comprising:—a laser beam generation device (4) provided for generating a laser beam (5) with beam properties defined by at least one laser beam parameter, especially a beam profile defined by at least one laser beam parameter;—a modulation device (9) assigned to the laser beam generation device (4) provided for purposefully changing at least one laser beam parameter that influences the beam properties, especially the beam profile, of the laser beam (5) generated by the laser beam generation device (4) on the basis of a target value that is or can be specified, especially by a user.

10 Claims, 3 Drawing Sheets

(51) Int. Cl.

| | | |
|---|---|---|
| *B29C 64/209* | (2017.01) | |
| *B29C 64/153* | (2017.01) | |
| *B22F 10/10* | (2021.01) | |
| *B33Y 30/00* | (2015.01) | |
| *B33Y 50/02* | (2015.01) | |
| *B23K 26/064* | (2014.01) | |
| *B23K 26/342* | (2014.01) | |
| *B23K 26/06* | (2014.01) | |
| *B28B 1/00* | (2006.01) | |
| *B28B 17/00* | (2006.01) | |

(52) U.S. Cl.
CPC ............ *B23K 26/342* (2015.10); *B28B 1/001* (2013.01); *B28B 17/0081* (2013.01); *B29C 64/393* (2017.08); *B33Y 30/00* (2014.12); *B33Y 50/02* (2014.12); *B22F 10/10* (2021.01); *B29C 64/153* (2017.08); *B29C 64/209* (2017.08)

(56) References Cited

U.S. PATENT DOCUMENTS

| | | | |
|---|---|---|---|
| 2002/0164069 A1 | 11/2002 | Nagano et al. | |
| 2003/0214571 A1* | 11/2003 | Ishikawa | B23K 26/0604 347/255 |
| 2010/0044353 A1 | 2/2010 | Olsen | |
| 2012/0223061 A1 | 9/2012 | Atsumi et al. | |
| 2013/0112672 A1* | 5/2013 | Keremes | B22F 3/1055 219/121.78 |
| 2014/0131327 A1 | 5/2014 | Nishitani et al. | |
| 2015/0309473 A1 | 10/2015 | Spadaccini et al. | |
| 2016/0243649 A1* | 8/2016 | Zheng | B29C 64/153 |
| 2016/0243679 A1 | 8/2016 | Hansley et al. | |
| 2018/0056590 A1 | 3/2018 | Costabeber | |

FOREIGN PATENT DOCUMENTS

| | | |
|---|---|---|
| JP | 2005/254281 A | 9/2005 |
| JP | 2010/036189 A | 2/2010 |
| JP | 2010/058128 A | 3/2010 |
| JP | 2010/508149 A | 3/2010 |
| JP | 2011/056544 A | 3/2011 |
| JP | 2014/094406 A | 5/2014 |
| JP | H07266064 A | 5/2014 |
| WO | 2016077250 A1 | 5/2016 |
| WO | WO-2016077250 A1 * | 5/2016 .............. B22F 3/105 |
| WO | WO2016/146185 A1 | 9/2016 |

OTHER PUBLICATIONS

European Search Opinion Corresponding to Application No. 17176129.

European Search Report Corresponding to Application No. 17176129 dated Feb. 7, 2018.

German Search Results Corresponding to Application No. 102016120244 dated Oct. 2, 2018.

Japanese Office Action Corresponding to Application No. 2017175389 dated Oct. 11, 2018.

Chinese Office Action Corresponding to Application No. 2017107111210 dated Apr. 29, 2019.

Japanese Office Action Corresponding to Application No. 2017175389 dated Sep. 2, 2019.

* cited by examiner

APPARATUS FOR ADDITIVELY MANUFACTURING OF THREE-DIMENSIONAL OBJECTS

CROSS-REFERENCE TO RELATED APPLICATIONS

This application claims priority to German Patent Application serial no. 10 2016 120 244.4 filed Oct. 24, 2016, the contents of which is incorporated herein by reference in its entirety as if set forth verbatim.

The invention relates to an apparatus for additive manufacturing of three-dimensional objects by successive, selective layer-by-layer exposure and thus solidification of construction material layers of a construction material that can be solidified by means of a laser beam generated by a laser beam generation device.

Respective apparatuses for additive manufacturing of three-dimensional objects are actually known. Typical embodiments of respective apparatuses are apparatuses for performing selective laser sintering or selective laser melting methods. An essential functional component of respective apparatuses is a laser beam generation device provided for generating the laser beam that serves to selectively expose respective construction material layers. The laser beam has beam properties defined by one or more laser beam parameter(s) or a beam profile defined by one or more laser beam parameter(s).

The laser beam generation devices of known apparatuses typically generate laser beams with a Gaussian intensity or beam profile. A possibly required change of the laser beam intensity can here only be effected by defocusing or shifting the focal position of the laser beam; however, the beam profile of the laser beam is not changed by that.

Especially with regard to maximum variability of the exposure strategies realizable with a respective apparatus, there is nevertheless a demand for an option to purposefully change the beam properties, especially the beam profile, of the laser beam generated by a laser beam generation device.

The invention is based on the object to provide, especially with regard to an option to purposefully change the beam properties, especially the beam profile, of the laser beam generated by a laser beam generation device, an improved apparatus for additive manufacturing of three-dimensional objects.

The object is solved by an apparatus for additive manufacturing of three-dimensional objects according to claim 1. The dependent claims relate to possible embodiments of the apparatus.

The apparatus described herein ("apparatus") is provided for additive manufacturing of three-dimensional objects, i.e., for example, technical components or technical component groups, by successive, selective layer-by-layer exposure and thus solidification of construction material layers of a construction material that can be solidified by means of a laser beam. The construction material can especially be particulate or powdered metal, plastic, and/or ceramic material. The selective solidification of respective construction material layers to be selectively solidified is performed based on object-related construction data. Respective construction data describe the geometric structural design of the respective object to be manufactured additively and can contain, for example, "sliced" CAD data of the respective object to be manufactured additively. The apparatus can be formed as an SLM apparatus, i.e. as an apparatus for performing selective laser melting methods (SLM methods), or as an SLS apparatus, i.e. as an apparatus for performing selective laser sintering methods (SLS methods).

The apparatus comprises the functional components typically required for performing additive construction processes, i.e., especially a laser beam generation device provided for generating a laser beam for successive, selective layer-by-layer solidification of individual construction material layers and a coating device provided for forming construction material layers to be selectively solidified in a construction plane. A construction plane can be a surface of a carrying element, typically supported movably (in vertical direction), of a carrying device or a construction material layer. Generally, at least one construction material layer selectively solidified or to be selectively solidified is formed in a construction plane. Additive construction processes performed by means of the apparatus take place in a process chamber associated with the apparatus which can typically be rendered inert. The process chamber can form part of a housing structure of the apparatus.

For generating a laser beam, the laser beam generation device is provided with beam properties defined by at least one laser beam parameter, i.e., especially amplitude, phase, polarization, i.e., especially a beam profile defined by at least one laser beam parameter. The laser beam generated by the laser beam generation device can have a Gaussian beam profile, for example.

The apparatus furthermore comprises a modulation device. The modulation device is provided for purposefully changing or modulating at least one laser beam parameter that influences the beam properties of the laser beam emanating from or generated by the laser beam generation device. The modulation device is especially provided for purposefully changing at least one laser beam parameter that influences the beam profile of the laser beam generated by the laser beam generation device, i.e., for purposefully changing the beam profile of the laser beam generated by the laser beam generation device. Therefore, by means of the modulation device, by purposefully changing respective laser beam parameters, laser beams with (almost) any beam properties, i.e., especially also changeable as to place and/or time, especially any beam profiles, to be mentioned merely as an example Gaussian or top hat profiles, can be generated. By means of the modulation device, especially the wave front of the laser beam generated by the laser beam generation device can be changed purposefully. Since the wave front significantly determines the beam profile, a changed wave front is typically associated with a changed beam profile of the laser beam. A changed wave front or beam profile can also be understood to mean a subdivision of a (single) wave front or a (single) beam profile of the laser beam generated by the laser beam generation device into several discrete beam profiles or wave fronts. Therefore, a laser beam with a (single) focus area can be generated into several laser beams with one focus area each by means of the modulation device.

Purposefully changing or modulating the at least one laser beam parameter that influences the beam properties is performed on the basis of a target value that is or can be specified, especially by a user, e.g., by programming. The target value can generally affect at least one laser beam parameter that affects the beam properties (target laser beam parameter). The target value can especially affect a beam profile (target beam profile) of the laser beam.

For specifying respective target values, the apparatus comprises a suitable input device, e.g., as part of a user interface of the apparatus via which a user can make (user) entries, i.e., especially image, text, or speech input, to specify a respective target value—generally to specify a laser beam having desired beam properties, i.e., especially a desired beam profile. A respective input device can be formed as or comprise a touch screen device, for example. Of course, it is also possible to make respective entries at an external input device which is nevertheless in data communication with the apparatus, e.g., as part of a computer.

From the preceding it follows that the modulation device is assigned to the laser beam generation device. The assignment of the modulation device to the laser beam generation device is especially designed such that the laser beam emanating from or generated by the laser beam generation device hits the modulation device. Hence, the modulation device is or can be connected to the beam path of the laser beam emanating from the laser beam generation device. In addition to any existing beam deflection device (scanner device), the laser beam generation device and the assigned modulation device can form the essential parts of an exposure device of the apparatus.

By implementing a respective modulation device, especially with regard to an option to purposefully change the beam properties, especially the beam profile, of the laser beam generated by a laser beam generation device, an improved apparatus for additive manufacturing of three-dimensional objects is provided.

However, by implementing a respective modulation device, further advantages arise for the apparatus and the additive construction processes performed with it:

For example, by purposefully changing the beam properties of the laser beam which can be realized by means of the modulation device, an improved quality of the objects manufactured or to be manufactured additively can be realized. The improved quality of the objects manufactured or to be manufactured additively results especially from the fact that, by purposefully changing the beam properties, tempering or temperature control that is resolved as regards place and/or time of construction material layers solidified or to be solidified selectively can be realized. This is advantageous especially for the processing of construction materials that are difficult to process, i.e., especially construction materials that can only be processed in a comparably narrow process window. By purposefully changing the beam properties, purposeful thermal influencing of the construction material around a solidification area, especially a melting area or pool, that is actually to be solidified in a construction material plane can be realized. Thus, a tempering or heat treatment effect facilitating the processability of the construction material can be achieved. Setting different beam profiles can have a positive impact, too, on the quality of the objects manufactured or to be manufactured additively.

By purposefully changing the beam properties by means of the modulation device, reduced construction times and thus increased efficiency of the additive construction processes that can be performed by means of the apparatus can furthermore be realized. The reduced construction times and the increased efficiency respectively result especially from the fact that different, i.e., for example, large-area or small-area, beam profiles can be realized according to requirements. For example, by subdividing an, e.g. planar, beam profile or an, e.g. planar, wave front, several, e.g. strip-shaped, beam profiles or several, e.g. strip-shaped, wave fronts can be realized. Regardless of a respective subdivision of a beam profile into several beam profiles, setting different beam profiles can have a positive impact, too, on the reduction of the construction times of the additive construction processes that can be performed by means of the apparatus.

By purposefully changing the beam properties by means of the modulation device, the modulation device can furthermore take on additional (optical) functions, so that the structural design of the apparatus can be simplified, if necessary. For example, the modulation device can serve to deflect or position the laser beam to or on a construction material layer, so that a beam deflection device can be spared, if necessary. The modulation device can also serve to change the focus level, so that a device for setting the focus level or optical elements, especially lenses, typically associated with a respective device can (also) be spared, if necessary. Finally, the modulation device can (also) serve to collimate the laser beam, so that a collimation device for collimation of the laser beam can (also) be spared, if necessary.

The modulation device can comprise several optical modulation elements ("modulation elements") that are or can be connected to the beam path of the laser beam emanating from or generated by the laser beam generation device, provided for influencing at least one laser beam parameter that influences the beam properties of at least one beam fraction of the laser beam generated by the laser beam generation device. Depending on the number and arrangement of respective modulation elements, it might be that individual, several, or all modulation elements are hit by a certain beam fraction of the laser beam emanating from the laser beam generation device. The beam fraction hitting a respective modulation element can be changed by means of the modulation element as regards its beam properties, i.e., for example, amplitude, phase, and polarization, so that, overall, a laser beam with changed beam properties, as mentioned, e.g. a changed beam profile, results.

The modulation elements are typically arranged or formed in a housing structure of the modulation device that is or can be connected to the beam path of the laser beam, in which they are typically provided in a defined spatial arrangement and/or orientation (relative to each other). The modulation elements can be arranged or formed, especially pixel-like, in at least one row and/or column. Hence, several modulation elements can be provided in adjacent arrangement in rows and/or columns.

The modulation elements can be switchable individually or in groups to a state (active state) that allows for influencing the at least one laser beam parameter that influences the beam properties of the laser beam. Every modulation element can especially be switched to a first state in which the respective modulation element allows an at least partial transmission or reflection of the laser beam or a laser beam fraction, and to a second state in which the respective modulation element does not allow an at least partial transmission or reflection of the laser beam or a laser beam fraction. The control underlying the switching of the modulation elements can be effected by means of a control device associated with the modulation device. The control device typically communicates (directly or indirectly) with the already mentioned input device of the apparatus via which respective target values that are or can be specified (by a user) can be input.

Concretely, the modulation elements can be or comprise liquid crystal elements. The modulation device can hence be formed as a spatial light modulator, SLM in short, provided for separate or cumulative influencing of individual or several laser beam parameters, i.e., especially amplitude, phase, or polarization, of the laser beam by means of a suitable arrangement, orientation, and switching of respective liquid crystal elements.

From the preceding paragraph it follows that the laser beam parameter that can be changed purposefully via the modulation device and influences the beam properties, especially the beam profile, can especially be the amplitude, phase, or polarization of the laser beam or wave front of the laser beam. The modulation device can therefore especially be provided for purposefully changing the amplitude, phase, or polarization of the laser beam or wave front of the laser beam.

As mentioned, the modulation device is or can typically be connected to the beam path of the laser beam emanating from or generated by the laser beam generation device. Hence, the modulation device is typically (optically) connected downstream of the laser beam generation device.

Based on that, according to a first exemplary embodiment, the modulation device can be arranged or formed between a collimating device, especially comprising at least one collimating lens, and an optical mirror device. The modulation device can be arranged or formed directly adjacent to both the collimating device and the mirror device. According to a second exemplary embodiment, an optical mirror device, a first lens device, especially comprising an optical lens, a spatial filter device, especially comprising an optical spatial filter, another lens device, especially comprising another optical lens, and a Fourier lens device, especially comprising a Fourier lens, can be connected downstream of the modulation device. Hence, by respectively arranging the aforementioned optical elements in the stated order, a constellation known as "4f projection" can be realized. From the preceding it follows that the modulation device can generally be arranged or formed in different arrangements between different optical elements of the apparatus or an exposure device of the apparatus.

If available, a beam deflection or scanner device provided for deflecting the laser beam to a construction material layer to be selectively exposed is (optically) connected downstream of the modulation device. The beam deflection device typically forms the last component connected to the beam path before emission of the laser beam from an exposure device of the apparatus, the parts of which are typically formed by the laser beam generation device and the modulation device, as mentioned.

The invention also relates to a modulation device for an apparatus as described. The modulation device is provided for purposefully changing at least one laser beam parameter that influences the beam properties, especially the beam profile, of a laser beam generated by a laser beam generation device of the apparatus on the basis of a target value that is or can be specified, especially by a user. The preceding explanations in connection with the apparatus apply analogously to the modulation device.

The invention is explained in more detail by means of exemplary embodiments in the drawings. In which:

FIGS. 1, 2 each show a schematic diagram of an apparatus according to an exemplary embodiment;

Figure 1:
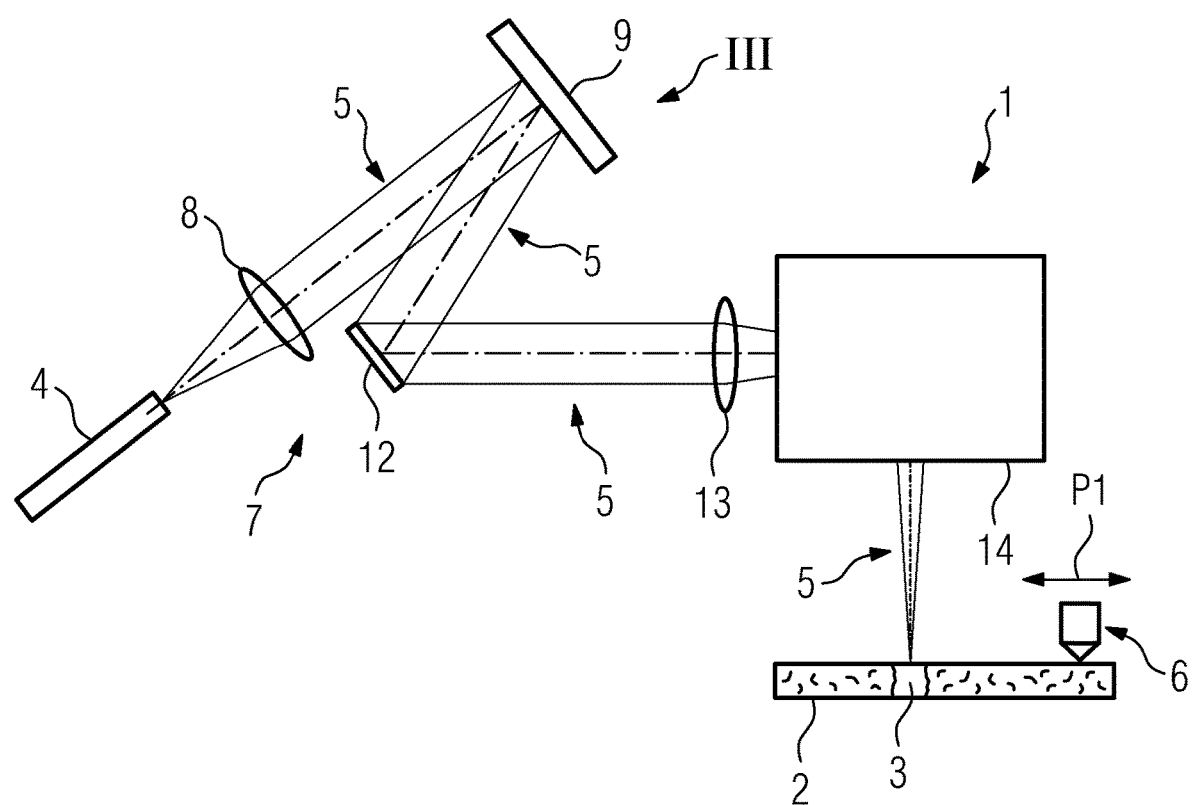
FIG. 1 shows a schematic diagram of an apparatus 1 according to an exemplary embodiment. Evidently, FIG. 1 only shows the section of the apparatus 1 relevant to explaining the principle described in the following.

The apparatus 1 serves for additive manufacturing of three-dimensional objects 2, i.e., especially technical components or technical component groups, by successive, selective layer-by-layer exposure and thus solidification of construction material layers of a construction material 3 that can be solidified, i.e., for example, metal powder, by means of a laser beam 5. The selective solidification of respective construction material layers to be solidified is performed based on object-related construction data. Respective construction data describe the geometric or geometric structural design of the respective object 2 to be manufactured additively. Respective construction data can, for example, include "sliced" CAD data of the object 2 to be manufactured.

The apparatus 1 can comprise a process chamber (not shown in detail) that can be rendered inert, in which the actual additive manufacturing of respective objects 2 is performed. In the process chamber, at least a part of the functional components required for performing additive construction processes can be arranged or formed, i.e., especially an, as indicated by the horizontally oriented double arrow P1, movably supported coating device 6 provided for forming construction material layers to be solidified in a construction plane. The process chamber can form part of the housing structure (not shown) of the apparatus 1.

For selective exposure of respective construction material layers, the apparatus comprises an exposure device 7 provided with several functional components. Structure and function of the functional components of the exposure device 7 are explained in the following:

A first component of the exposure device 7 is a laser beam generation device 4. For generating a laser beam 5, the laser beam generation device 4 is provided with beam properties defined by at least one laser beam parameter, i.e., especially amplitude, phase, polarization, i.e., especially a defined beam profile. The laser beam 5 generated by the laser beam generation device 4 can have a Gaussian beam profile, for example.

A collimating device 8 comprising a collimating lens (not denoted in more detail) is (optically) connected directly downstream of the laser beam generation device 4. The collimating device 8 serves to collimate, i.e., to parallelize, the (divergent) laser beam 5 emanating from the laser beam generation device 4. The collimating device 8 is thus connected to the beam path of the laser beam 5.

A modulation device 9 is (optically) connected directly downstream of the collimating device 8. The modulation device 9 is provided for purposefully changing or modulating at least one laser beam parameter that influences the beam properties of the laser beam 5. The modulation device 9 is especially provided for purposefully changing at least one laser beam parameter that influences the beam profile of the laser beam 5, i.e., for purposefully changing the beam profile of the laser beam 5. By means of the modulation device 9, by purposefully changing respective laser beam parameters, laser beams 5 with (almost) any beam properties, i.e., especially changeable as to place and/or time, especially any beam profiles, to be mentioned merely as an example Gaussian or top hat profiles, can be generated. By means of the modulation device 9, especially the wave front and thus the beam profile of the laser beam 5 can be changed purposefully. A changed wave front or beam profile can also be understood to mean a subdivision of a (single) beam profile of the laser beam 5 into several discrete beam profiles, as explained further below in the context of the description of the cross-sections and intensity profiles shown in FIGS. 6, 7.

The purposeful changing of respective laser beam parameters that influence the beam properties of the laser beam 5 possible by means of the modulation device 9 is performed on the basis of a target value that is or can be specified, especially by a user, e.g., by programming. The target value can affect at least one laser beam parameter that affects the beam properties (target laser beam parameter). The target value can especially affect a beam profile (target beam profile) of the laser beam 5.

For specifying respective target values, the apparatus 1 comprises a suitable input device (not shown), e.g., as part of a user interface (not shown) of the apparatus via which a user can make (user) entries, i.e., especially image, text, or speech input, to specify a respective target value—generally to specify a laser beam 5 having desired beam properties, i.e., especially a desired beam profile.

The modulation device 9 is hence assigned to the laser beam generation device 4. The assignment of the modulation device 9 to the laser beam generation device 4 is designed such that the laser beam 5 emanating from or generated by the laser beam generation device 4 hits the modulation device 9. The modulation device 9 is thus also connected to the beam path of the laser beam 5.

Figure 3:
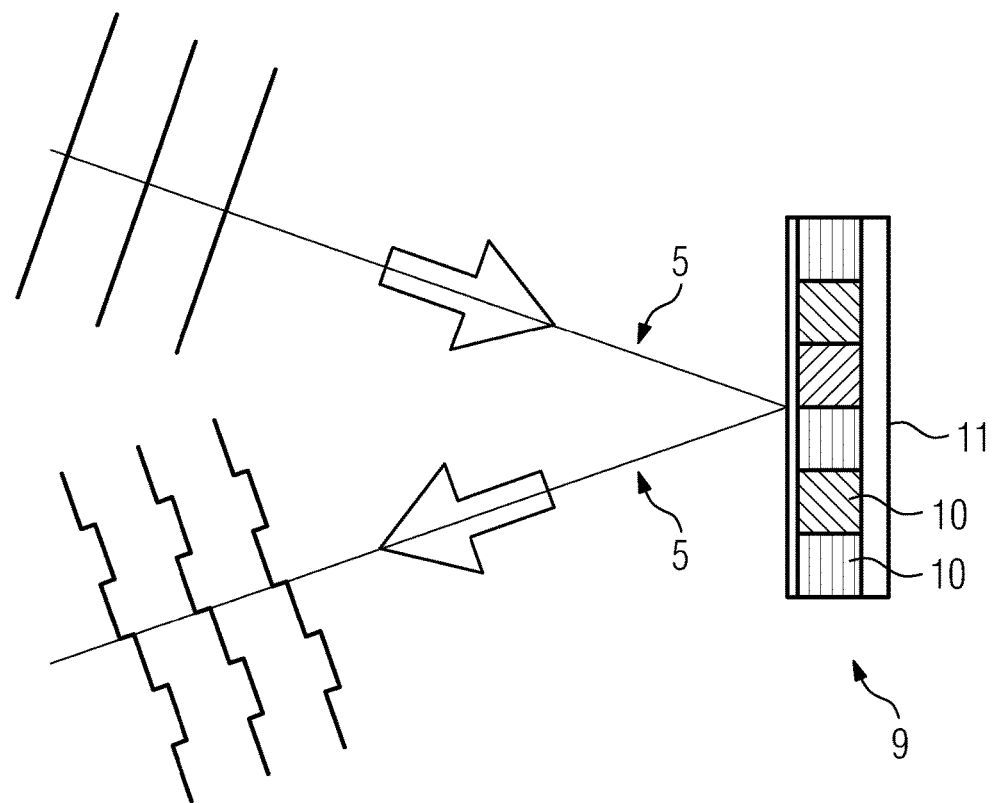
FIG. 3 shows a schematic diagram of the individual unit III shown in FIGS. 1, 2.

As results from FIG. 3, which shows a schematic diagram of the individual unit III shown in FIG. 1, 2, the modulation device 9 comprises several optical modulation elements 10 that are or can be connected to the beam path of the laser beam 5, provided for influencing a laser beam parameter that influences the beam properties of at least one beam fraction of the laser beam 5. Depending on the number and arrangement of respective modulation elements 10 it might be that individual, several, or all modulation elements 10 are hit by a certain beam fraction of the laser beam 5. The beam fraction hitting a respective modulation element 10 can be changed by means of the modulation element 10 as regards its beam properties, i.e., for example, amplitude, phase, and polarization, so that, overall, a laser beam 5 with changed beam properties results.

From FIG. 3 it can be seen that the modulation elements 10 are arranged or formed in a housing structure 11 of the modulation device 9 connected to the beam path of the laser beam 5, in which they are provided in a defined spatial arrangement and/or orientation (relative to each other). The modulation elements 10 are arranged or formed, especially pixel-like, in a row and/or column—of course, an arrangement in several rows and/or columns is imaginable as well.

The modulation elements 10 can be switchable individually or in groups to a state (active state) that allows for influencing a laser beam parameter that influences the beam properties of the laser beam 5. Every modulation element 10 can especially be switched to a first state in which the respective modulation element 10 allows, e.g., an at least partial transmission or reflection of the laser beam 5 or a laser beam fraction, and to a second state in which the respective modulation element 10 does not allow, e.g., an at least partial transmission or reflection of the laser beam 5 or a laser beam fraction. The control underlying the switching of the modulation elements 10 can be effected by means of a control device (not shown) associated with the modulation device 9. The control device communicates (directly or indirectly) with the already mentioned input device of the apparatus via which respective target values that are or can be specified (by a user) can be input.

Concretely, the modulation elements 10 are liquid crystal elements. The modulation device 9 is hence formed as a spatial light modulator, SLM in short, provided for separate or cumulative influencing of individual or several laser beam parameters, i.e., especially amplitude, phase, or polarization, of the laser beam 5 by means of a suitable arrangement, orientation, and switching of respective liquid crystal elements. Hence, the laser beam parameter that can be changed purposefully via the modulation device 9 and influences the beam properties, especially the beam profile, can especially be the amplitude, phase, or polarization of the laser beam 5 or the wave front of the laser beam 5. The modulation device 9 is therefore especially provided for purposefully changing the amplitude, phase, or polarization of the laser beam 5 or the wave front of the laser beam 5.

The exemplary embodiment shown in FIG. 3 illustrates that the modulation device 9 can be provided for generating, by purposefully changing the phase of the laser beam 5 (without changing the intensity and polarization of the laser beam 5) starting from a planar beam profile or a planar wave front of the laser beam 5, a step-like or step-shaped beam profile or a step-like or step-shaped wave front of the laser beam 5 due to purposeful changing of the phase. Of course, this is to be understood purely exemplarily.

A mirror device 12 comprising a mirror element (not denoted in more detail) is (optically) connected directly downstream of the modulation device 9. The mirror device 12 serves to deflect the laser beam 5 emanating from the modulation device 9 to a Fourier lens device 13 comprising a Fourier lens (not denoted in more detail) (optically) connected directly downstream of the mirror device 12. The mirror device 12 and the Fourier lens device 13 are thus also connected to the beam path of the laser beam 5.

A beam deflection device 14 (scanner device) is (optically) connected directly downstream of the Fourier lens device 13. The beam deflection device 14 serves to purposefully deflect the laser beam 5 to respective construction material layers to be selectively solidified. Thus, the beam deflection device 14 forms the last component of the exposure device 7 connected to the beam path of the laser beam 5 before emission of the laser beam 5 from the exposure device 7.

Figure 2:
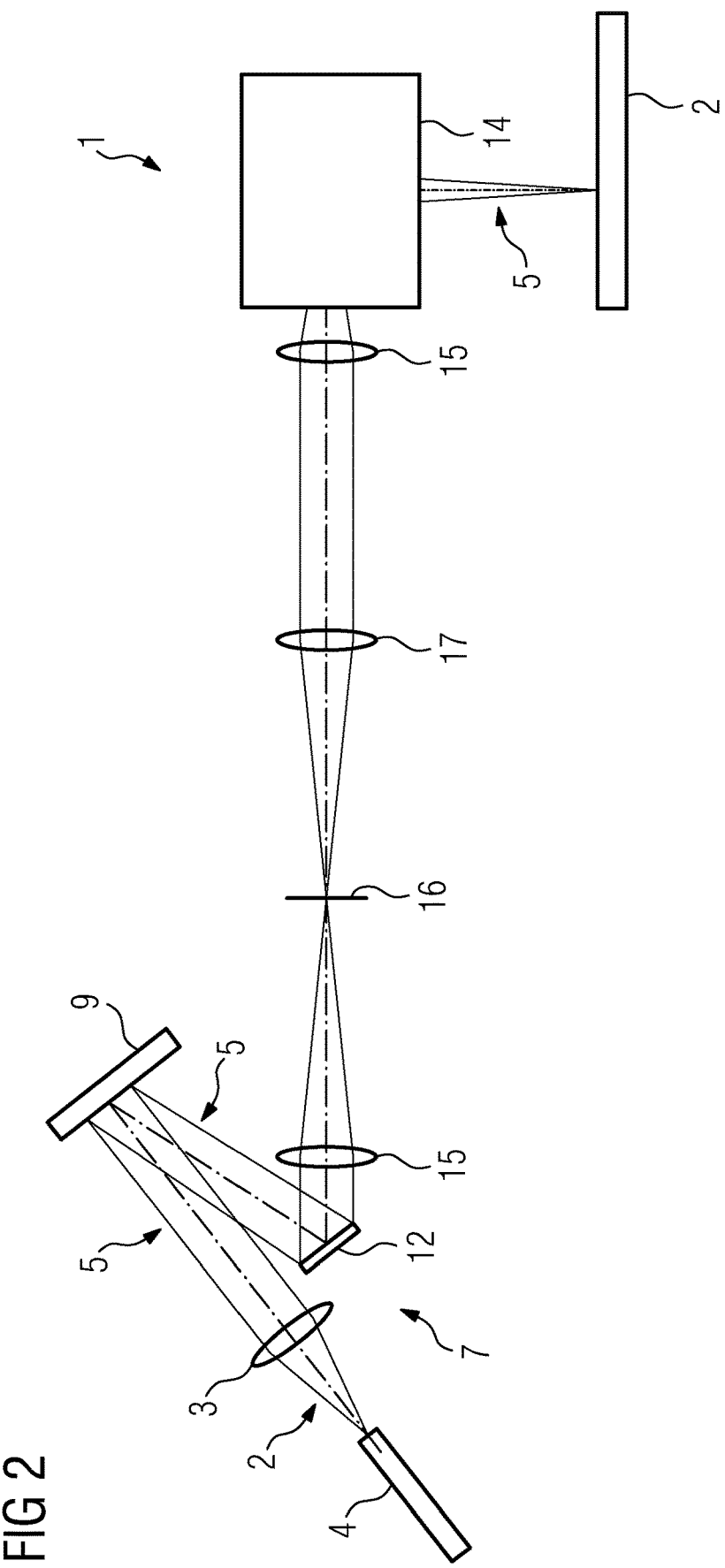

FIG. 2 shows a schematic diagram of an apparatus 1 according to another exemplary embodiment. Evidently, FIG. 2 also only shows the section of the apparatus 1 relevant to explaining the principle described.

In the exemplary embodiment shown in FIG. 2, a first (or further) lens device 15 comprising an optical lens (not denoted in more detail) is (optically) connected directly downstream of the mirror device 12. A spatial filter device 16 comprising an optical spatial filter (not denoted in more detail), e.g., in the form of a pinhole, is (optically) connected directly downstream of the first lens device 15. A second (or further) lens device 17 comprising another optical lens (not denoted in more detail) is (optically) connected directly downstream of the room filter device 16. The Fourier lens device 13 and the beam deflection device 14 are connected downstream of the further lens device 17. With the described arrangement of the aforementioned optical elements in the stated order, a 4f projection can be realized.

Figure 4:
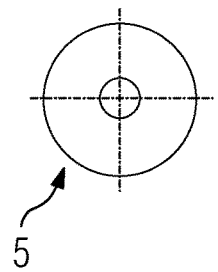
FIGS. 4-7 each show a schematic diagram of a beam profile.
Figure 5:
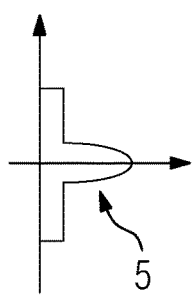
Figure 6:

FIGS. 4-7 each show a schematic diagram of a beam profile of a laser beam 5. FIGS. 4 and 6 each show a cross-section (referred to the direction of propagation of the laser beam 5) of a laser beam 5 changed by means of the modulation device 9 on the basis of a target value that is or can be specified. FIG. 5 shows the intensity distribution for the cross-section of the laser beam 5 shown in FIG. 4; FIG.

7 shows the intensity distribution of the cross section of the laser beam 5 shown in FIG. 6.

From FIGS. 4, 6 it can be seen that, by means of the modulation device 9, e.g., cross-sectionally circular laser beams 5 with an intensity that can be changed in radial direction—concretely, the intensity decreases in radial direction from inside to outside—can be generated.

Figure 7:
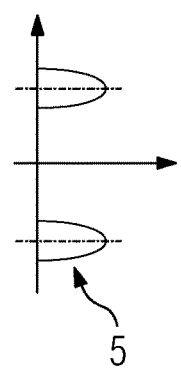

From FIGS. 5, 7 it can be seen that, by means of the modulation device 9, also a subdivision of a (single) beam profile of the laser beam 5 into several discrete beam profiles or wave fronts can be realized. Concretely, the laser beam 5 emanating from the laser beam generation device 4 is here subdivided into two point-like or point-shaped laser beams 5 with a comparably pointed intensity distribution.

The invention claimed is:

1. An apparatus for additively manufacturing three-dimensional objects, the device comprising:
    a laser beam generation device provided for generating a laser beam with beam properties defined by at least one laser beam parameter;
    a collimating device disposed downstream of the laser beam generation device;
    an optical mirror device disposed downstream of the collimating device; and,
    a modulation device disposed between the collimating device and the optical mirror device such that the laser beam generated by the laser beam generation device reaches the modulation device before the optical mirror device;
    wherein the modulation device is assigned to the laser beam generation device provided for purposefully changing at least one laser beam parameter that influences the beam properties of the laser beam generated by the laser beam generation device on the basis of a target value that is or can be specified.

2. The apparatus of claim 1, wherein the modulation device comprises a plurality of optical modulation elements that are or can be connected to the beam path of the laser beam generated by the laser beam generation device, provided for influencing at least one laser beam parameter that influences the beam properties of at least one beam fraction of the laser beam generated by the laser beam generation device.

3. The apparatus of claim 2, wherein the optical modulation elements are arranged or formed in at least one row and/or column.

4. The apparatus of claim 1, wherein the optical modulation elements are switchable individually or in groups to a state that allows for influencing the at least one laser beam parameter that influences the beam properties of the laser beam.

5. The apparatus of claim 2, wherein the optical modulation element is formed as or at least comprises a liquid crystal element.

6. The apparatus of claim 1, wherein the modulation device is formed as or comprises a spatial light modulator.

7. The apparatus of claim 1, wherein the collimating device comprises at least one collimating lens.

8. The apparatus of claim 1, wherein the modulation device is optically connected downstream of the laser beam generation device, wherein an optical mirror device, a first lens device, a spatial filter device, another lens device, and a Fourier lens device, are connected downstream of the modulation device.

9. The apparatus of claim 1, wherein a beam deflection device, which is provided for deflecting the laser beam to a construction material layer to be exposed selectively, is connected downstream of the modulation device.

10. The apparatus of claim 1, wherein the laser beam parameter that can be changed purposefully via the modulation device and influences the beam properties comprises:
    the amplitude of the laser beam, wherein the modulation device is provided for changing the amplitude of the laser beam, and/or
    the phase of the laser beam, wherein the modulation device is provided for changing the phase of the laser beam, and/or
    the polarization of the laser beam, wherein the modulation device is provided for changing the polarization of the laser beam.

* * * * *